United States Patent
Dinc et al.

(10) Patent No.: US 9,525,639 B2
(45) Date of Patent: Dec. 20, 2016

(54) 2.5 GBPS/5GBPS ETHERNET COMMUNICATIONS OVER A FULL DUPLEX COMMUNICATION CHANNEL

(71) Applicant: BROADCOM CORPORATION, Irvine, CA (US)

(72) Inventors: Kadir Dinc, Irvine, CA (US); Kishore Kota, Aliso Viejo, CA (US); Alan Youssef Kwentus, Coto de Caza, CA (US); German Stefan Otto Feyh, Boulder, CO (US)

(73) Assignee: BROADCOM CORPORATION, Irvine, CA (US)

( * ) Notice: Subject to any disclaimer, the term of this patent is extended or adjusted under 35 U.S.C. 154(b) by 166 days.

(21) Appl. No.: 14/492,860

(22) Filed: Sep. 22, 2014

(65) Prior Publication Data

US 2015/0350096 A1   Dec. 3, 2015

Related U.S. Application Data

(60) Provisional application No. 62/004,059, filed on May 28, 2014, provisional application No. 62/025,576, filed on Jul. 17, 2014.

(51) Int. Cl.

| | |
|---|---|
| *G06F 11/00* | (2006.01) |
| *H04J 1/16* | (2006.01) |
| *H04L 1/00* | (2006.01) |
| *H04L 12/26* | (2006.01) |
| *H04L 12/825* | (2013.01) |
| *H04L 5/14* | (2006.01) |

(52) U.S. Cl.
CPC .............. *H04L 47/25* (2013.01); *H04L 1/0002* (2013.01); *H04L 5/1423* (2013.01)

(58) Field of Classification Search
CPC .......... H04L 47/25; H04L 1/0002; H04L 5/14; H04L 5/1423
USPC ................................. 370/230, 252, 254, 253
See application file for complete search history.

(56) References Cited

U.S. PATENT DOCUMENTS

| | | | |
|---|---|---|---|
| 6,977,896 B1 * | 12/2005 | Kobayashi .......... | H04L 12/5695 370/235 |
| 7,236,451 B2 * | 6/2007 | De Francesco ......... | H04L 47/10 370/208 |

(Continued)

*Primary Examiner* — Chuong T Ho
(74) *Attorney, Agent, or Firm* — Garlick & Markison; Randy W. Lacasse

(57) ABSTRACT

Transceiver architecture includes circuitry and a method to transmit and receive high speed WAP data over lower speed cabling such as Cat5e. The method begins by measuring quality of a wired bi-directional communications channel. The method continues by selecting a maximum possible data transmission rate over the wired bi-directional communications channel for the measured quality level and when the maximum possible data transmission rate is a reduced data transmission rate less than a maximum data transmission rate of the transceivers, proportionally adjusting clock rates of circuit elements of the first and second transceiver to transfer the data at the reduced data transmission rate. The method includes dividing data frames of the data to be transmitted N times, where N=number of layers of at least a portion of identical transceiver processing circuitry which is connected to twisted wiring pairs of the wired bi-directional communications channel.

17 Claims, 7 Drawing Sheets

(56) References Cited

U.S. PATENT DOCUMENTS

| | | | |
|---|---|---|---|
| 2004/0076222 A1* | 4/2004 | De Francesco | H04L 47/10 375/141 |
| 2009/0080459 A1* | 3/2009 | Barkan | H04L 1/0002 370/463 |
| 2009/0245120 A1* | 10/2009 | Jones | H04L 12/413 370/252 |
| 2012/0314716 A1* | 12/2012 | Barkan | H04L 1/0002 370/465 |
| 2015/0171991 A1* | 6/2015 | Farjadrad | H04L 49/351 375/295 |

* cited by examiner

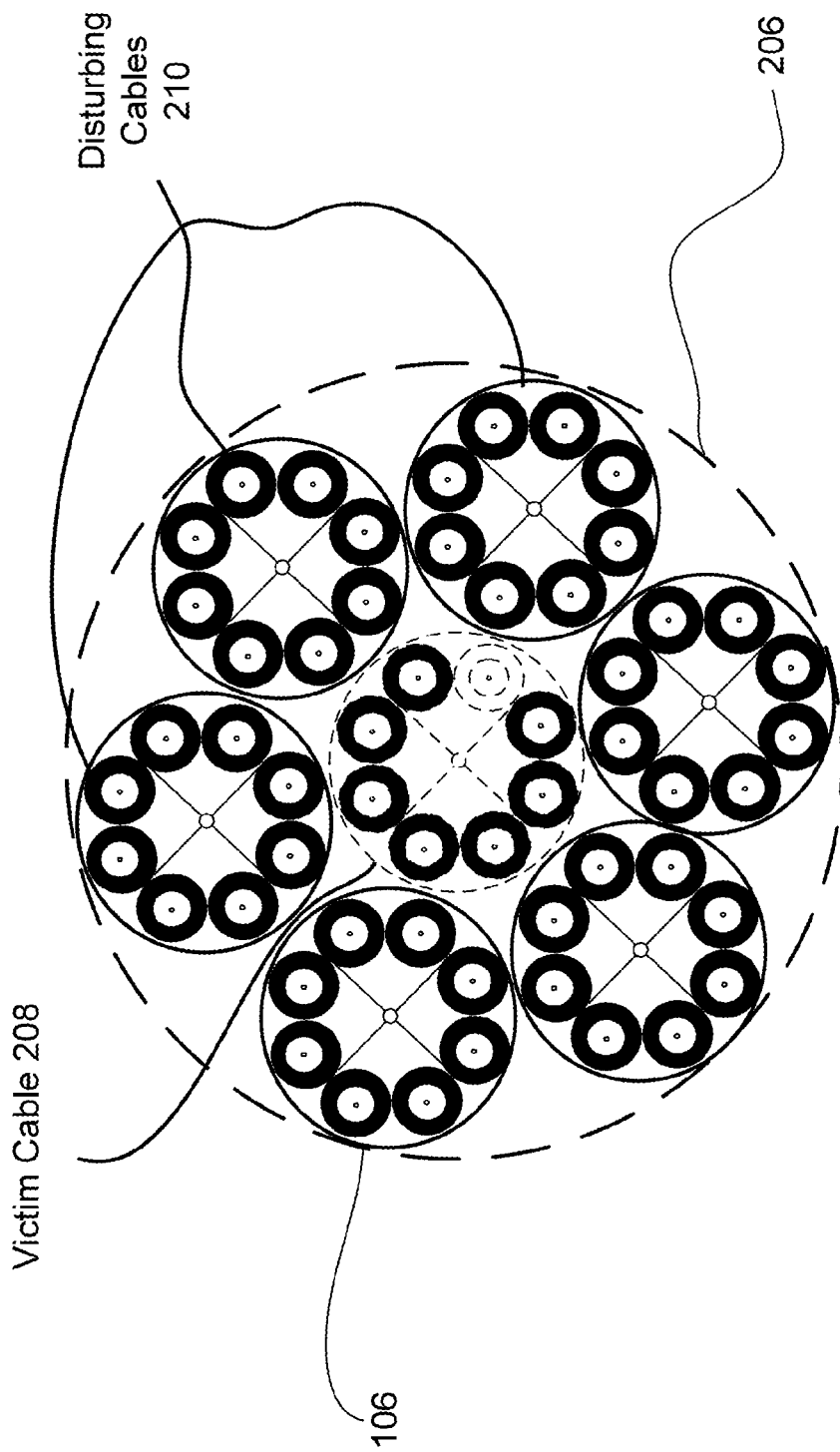

2.5 GBPS/5GBPS ETHERNET COMMUNICATIONS OVER A FULL DUPLEX COMMUNICATION CHANNEL

CROSS REFERENCE TO PRIORITY APPLICATIONS/INCORPORATION BY REFERENCE

The present U.S. Utility Patent Application claims priority pursuant to 35 U.S.C. §119(e) to U.S. Provisional Application No. 62/004,059, entitled "2.5 GBPS/5 GBPS ETHERNET COMMUNICATIONS OVER A FULL DUPLEX COMMUNICATION CHANNEL," filed May 28, 2014; and U.S. Provisional Application No. 62/025,576, entitled "2.5 GBPS/5 GBPS ETHERNET COMMUNICATIONS OVER A FULL DUPLEX COMMUNICATION CHANNEL," filed Jul. 17, 2014, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

The present disclosure relates to communications devices; and more particularly to high-speed wired communications devices.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, wireless wide area networks (e.g., WiMAX), advanced mobile phone services (AMPS), digital AMPS, global system for mobile communications (GSM), North American code division multiple access (CDMA), Wideband CDMA, local multi-point distribution systems (LMDS), multi-channel-multi-point distribution systems (MMDS), radio frequency identification (RFID), Enhanced Data rates for GSM Evolution (EDGE), General Packet Radio Service (GPRS), and many others. Communication systems may also operate according to propriety formats and formats that are modified standard formats. Typically, the communication format is selected to suit a particular need and/or implementation.

Many devices such as PCs, smartphones, digital cameras, printers, tablet computers connect to each other and to the Internet through Wireless Access Points (WAP). The coverage of one or more of these access points called hotspots can extend from an area of a small room to many miles with multiple overlapping access points. WAP units connect to various network devices such as servers/routers through Ethernet adapters over wired networks. A typical network in FIG. 1 shows the wiring between the router/switch and several WAP units as will be discussed further hereafter.

Meeting the demand for higher speed requires not only increase in the number of WAP connections but also an increase in the speed of the wired connections between the WAP units and the routers. The demand for faster speeds on the wired connections also spurred technological evolution on data carrying techniques. As such, copper and fiber transmission standards have progressed, providing greater bandwidth over Ethernet architectures. But higher speeds also required higher quality connection media.

These new speeds such as 10 Gbps (10G) require higher quality cables such as Cat6a (category 6a) or even require fiber connections between devices. However, the legacy backbones still exist in the buildings and houses which are mainly based on unshielded CAT5 cable, such as Cat5e (category 5 enhanced), that are suitable to transmit 1 Gbps speeds. There is a need to support the next generation WAP standards over the existing networks. Such an emerging WAP standard is 802.11ac which can provide data rates beyond 1 Gbps. The only available Ethernet adapter that can support the new WAP rates is 10GBASE-T standard that runs at 10 Gbps rate. However, as previously discussed, 10GBASE-T systems require a new type of cabling based on the more expensive Cat6a. Removing all Cat5e cables to re-cable the networks with Cat6a is an enormous task that is cost prohibitive.

BRIEF DESCRIPTION OF THE SEVERAL VIEWS OF THE DRAWING(S)

FIG. 2B illustrates one embodiment of a communications system wiring configuration in accordance with the present disclosure;

DETAILED DESCRIPTION

Figure 1:
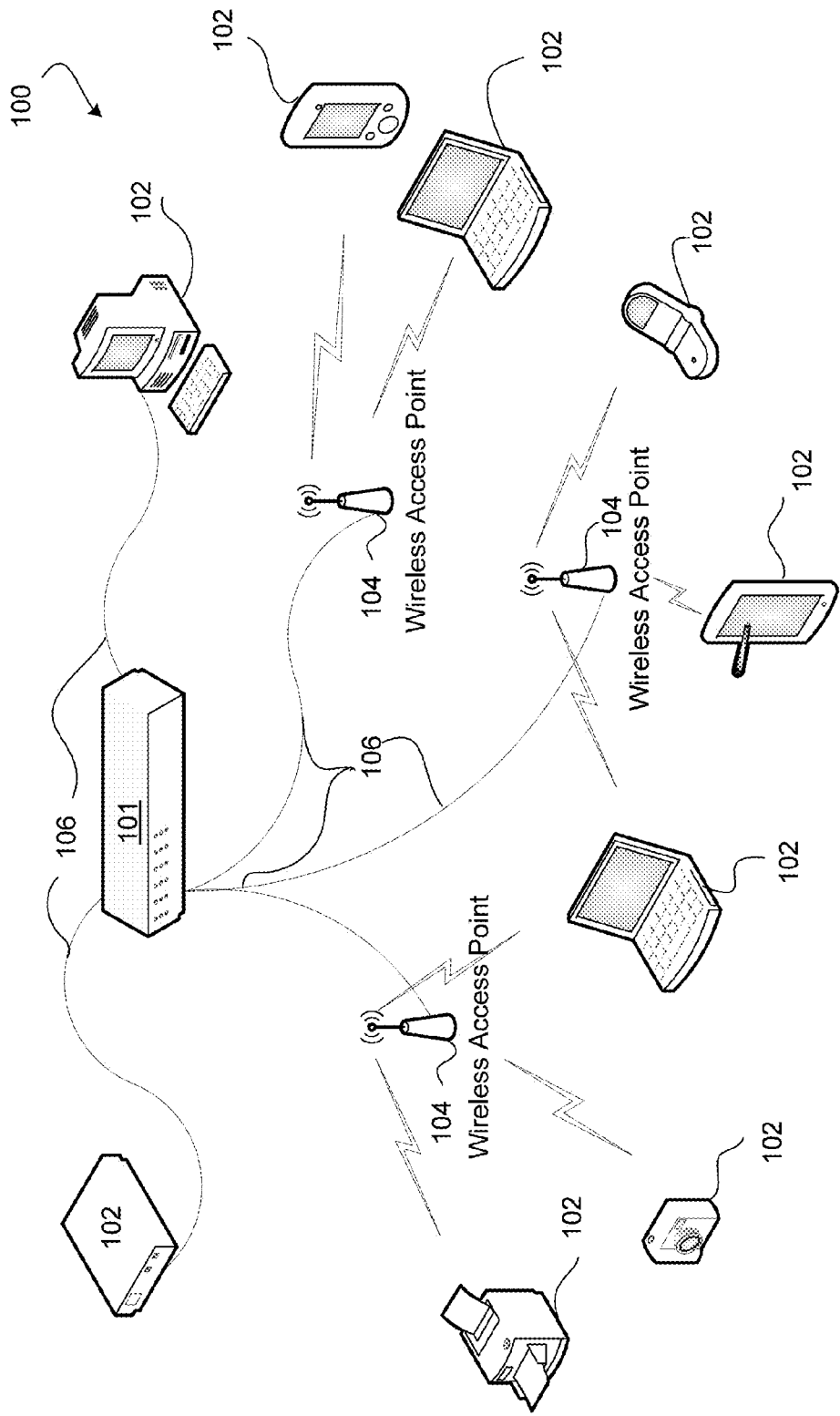
FIG. 1 illustrates one embodiment of a communications network in accordance with the present disclosure.

FIG. 1 illustrates one embodiment of a communications network in accordance with the present disclosure. Communications network 100 (e.g., 802.11) has one or more communication devices (102), wired or wireless, communicating on the network. Internet services (e.g., broadband or high speed broadband) are communicatively connected to wireless access points (WAPs) 104 over wired 106 (e.g., telephone, fiber, satellite, or cable (e.g., Cat5e)) or wireless networks (e.g., 3G, 4G, etc.) through router 101. Wireless access points (WAPs) 104 (e.g., wireless routers) are connected to communication devices 102 and manage connection of the various devices to the internet (e.g., forming a hotspot) using, for example, the 802.11ac protocol. However, other variations of the 802.11 standard or future communication protocols can be used without departing from the scope of the technology described herein.

The 802.11 infrastructure network, such as the previously described communications network, forms a wireless local area network (WLAN) which is distinguished by the use of at least one wireless access point (WAP). The WAP sends its capabilities in beacon frames or probe response frames. A beacon frame is a frame that is periodically transmitted by the WAP to announce its availability. Alternatively, a probe response frame is a frame sent from the WAP in response to a probe request frame sent from a communications device. The probe response frame provides capability information, supported data rates and other access point details pertaining to the WLAN.

In one or more embodiments of the technology described herein, the communication devices can be personal computers, laptops, tablets, PDAs, smartphones, mobile phones (e.g., cellular telephones), devices equipped with wireless local area network or Bluetooth transceivers, FM tuners, TV tuners, digital cameras, digital camcorders, wireless printers, or other devices that either produce, process or use audio, video signals or other data or communications.

In operation, the communication devices include one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications.

Figure 2A:
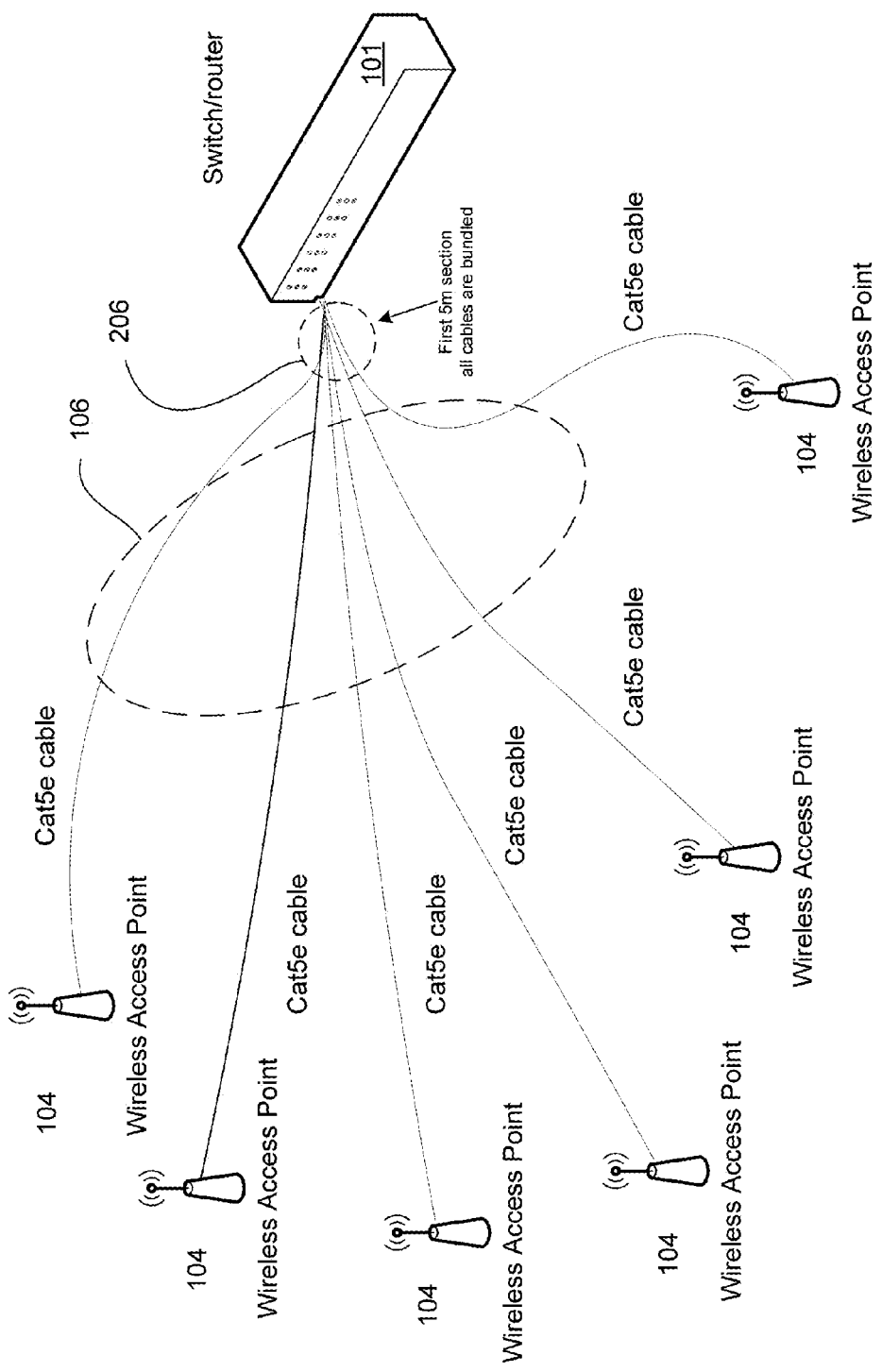
FIG. 2A illustrates one embodiment of a communications system in accordance with the present disclosure.

FIG. 2A illustrates one embodiment of a communications system in accordance with the present disclosure. Cat5e bundled cables 106 may include several possible WAP cabling configurations with different lengths and at different speeds such as 2.5/5/10 Gbps Ethernet speeds. As shown, typical existing Cat5e wiring in a building is used to support a WAP network.

Due to the nature of the WAP network cabling layout, cables between the router 101 and WAP units 104 may have multiple connected sections (e.g., at least three connected sections). For example, one typical configuration may include a first 5 m section (e.g., from router to wiring distribution panel), a second 50 m section (to physical location near WAP) and the last section connecting directly to the WAP can be either 2.5 m, 10 m or 25 m. The first 5 m cable coming off the router as shown in FIG. 2A is bundled 206 with, for example, six other 5 m Cat5e cables as further shown in FIG. 2B which can induce cross-talk amongst the bundled cables.

FIG. 2B illustrates one embodiment of a communications system wiring configuration in accordance with the present disclosure. Bundled cabling 206 may induce undesirable cross talk which induces noise on a victim cable 208 from the surrounding cables. The surrounding cables causing the interference are called the "disturbing cable(s) 210," while the cables experiencing the interference are the "disturbed or victim cable(s) 208." Crosstalk is usually caused by undesired capacitive, inductive, or conductive coupling from one electrical channel (e.g., wired pair, cable, etc.) to another. As shown, one or more wires or wire pairs (shown as dashed line in victim/disturbed cable 208) are affected by crosstalk which degrades the quality of the communications signals passing within. With the bundling of Cat5 cables, the induced cross-talk amongst the bundled cables reduces or prevents realization of quality communications at the various speeds. For example, sending data at 10G over existing Cat5 cabling with cross-talk is almost impossible as the noise increases with frequency.

There are different types of cross-talk. For example, near end crosstalk (NEXT) is a measure of the ability of cabling to reject near end crosstalk. Interference between cables is measured at the same end of the cable as the interfering transmitter. With the bundling of cables, the signals traveling through adjacent cables interfere with each other (also called Alien crosstalk (AXT) interference).

The NEXT value for a given cable type is generally expressed in decibels per feet or decibels per 1000 feet. NEXT values vary with the frequency of transmission. The higher the NEXT value, the greater the cable's ability to reject crosstalk at its local connection. Generally specifications for cabling (such as Cat5) include the minimum NEXT values. Power sum near end crosstalk (PSNEXT) includes a NEXT measurement which includes the sum of all crosstalk contributions. Far end crosstalk (FEXT) includes interference between cables measured at the other end of the cable with respect to the interfering transmitter.

Figure 3A:
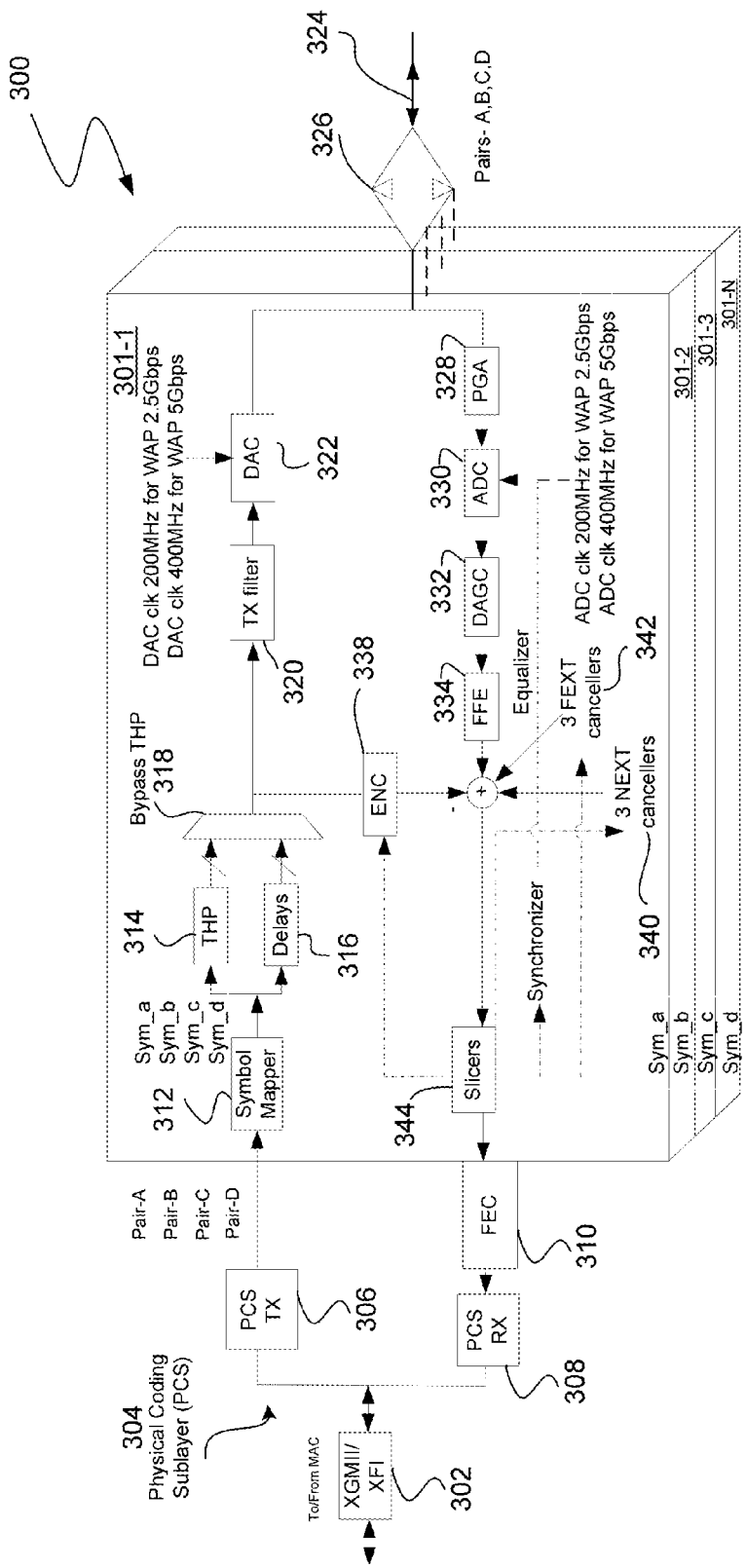
FIG. 3A illustrates an example embodiment transceiver architecture in accordance with the present disclosure.

FIG. 3A illustrates an example embodiment transceiver architecture 300 in accordance with the present disclosure. In an example embodiment, the transceiver is based on an existing 10 GBASE-T standard. Data at 10 Gigabit per second (10 Gbps or 10G) data rates using, for example, a 10 Gigabit Media Independent Interface (XGMII) or 10 Gigabit per second chip-to-chip electrical interface (XFI), is transferred to/from a Media Access Control (MAC) layer (router/switch) through to XGMII/XFI 302 and passed to Physical Coding Sub-layer (PCS) block 304. Data rates are reduced (see FIG. 3B description) to 2.5 Gbps (2.5G) or 5 Gbps (5G) for Physical Coding Sub-layer (PCS) block 304 that includes PCS TX (transmitter) 306 (FIG. 3B) and PCS RX (receiver) 308 (FIG. 3C) and may include forward error correction (FEC) 310 on a receiver communication path.

For each circuit element within the transceiver, a clock rate (speed) that is typically determined by a frequency of an oscillator crystal is used to operate the various circuit elements. Typically a crystal oscillator produces a fixed sine wave—the frequency reference signal. Electronic circuitry translates that into a square wave at the same frequency for digital electronics applications (or, in using a multiplier, some fixed multiple of the crystal reference frequency). The clock distribution network inside the circuit carries that clock signal to all the parts that need it. In accordance with the present application embodiments, to transmit data signals at a maximum data rate across existing cabling (e.g., Cat5e), while allowing for interference (as previously described), the data rates are typically reduced from a maximum data transmission rate (e.g., 10G). In accordance with the reduced data transmission rate, existing maximum clock rates for transmission circuitry are adjusted proportionally (reduced). The formula for an adjusted clock rate calculation is:

adjusted clock rate=((R)/(M))*(MCF), where

R=reduced data transmission rate
M=maximum data transmission rate
MCF=maximum data transmission rate clock frequency For example, if a 10G circuitry clock rate is 800 MHz, a rate of 200 MHZ would be used for a 2.5 GHz data rate (2.5/10)*800 MHz=200 MHz). While shown and described completely for single layer 301-1, the elements and processes are repeated on additional layers 301-2 through 301-N. In an example embodiment, three additional layers (total of 4) are implemented or one layer for each of the twisted wired pairs in an example Cat5 cable (e.g., 4 pairs) connected cable (used as a wired transmission medium). In this embodiment, the output of PCS TX block 306, which is one data frame, is divided into four parallel sub-frames. For example, if the one data frame is s0, s1, s2, s3, s4, s5, s6, s7. . . , then the data sub-frames to be transmitted over twisted pairs wires (e.g., Cat5e) is pair A=s0, s4 . . . ; pair B=s1, s5 . . . pair C=s2, s6 . . . ; and pair D=s3, s7 . . . etc. The four sub-frames are then input to four respective DSQ128 (Double Square Quadrature amplitude modulation (QAM) 128 point) symbol mappers 312 (one on each layer).

The data symbols output from the symbol mappers are input to pre-equalizers (e.g., Tomlinson-Harashima (THP)) 314 including delay block 316. During synchronization (training mode) between the transmitter and receiver, data frames bypass the THP as bypass THP 318 switches to delay block 316. After completion of sync/training, bypass THP 318 switches to receive data from the THP 314 (data mode). The function of these THP blocks is to mitigate the effect of the intersymbol interference (ISI) of the channel (cable) by employing the decision feedback equalizer of the receiver at the transmitter. By doing so, the system overcomes error propagation problems of the decision feedback equalizers at the receiver. For example, THP pre-equalizers 314 transform the output of the symbol mapper 312 according to a predetermined symbol response of the overall channel.

The output of THP 314 (through bypass switch 318) is then applied to digital TX filter 320 in order to reduce the electromagnetic emission due to common to differential conversion over the cable. The filtered signals are then applied to a digital to analog converter (DAC) 322 which is clocked at one half speed (e.g., 10G system 800 MHz) for 5G data speeds and one quarter speed (of 10G system 800 MHz) for 2.5G data speeds. As shown, the DAC clock is 200 MHz (100 MHz bandwidth) for 2.5G and 400 MHZ (200 MHz bandwidth) for 5G. The analog data signals from each layer are then transmitted over their respective twisted pairs in the cable 324 (4 pairs connected by an RJ-45 connector) via transformers 326. These analog signals are transmitted to remote units (with transceivers) over the 4 twisted copper pair within the cat5e cable.

The receive path of system 301 will now be described. As with the transmit path, the elements will be shown and described completely only for a single layer 301. However, the elements and processes are repeated (e.g., on three additional layers) for each of the wired pairs in the Cat5 cable (e.g., 4 pairs).

The receive path data signals are received over 4 twisted copper pairs within Cat5e cable 324. The received analog signals at the remote unit are amplified by programmable gain amplifier (PGA) 328, sampled by an analog to digital converter (ADC) 330 at 200 MHz/400 MHz analog clocks for wireless application protocol (WAP) 2.5 Gbps/5 Gbps speeds modes, respectively. The gain of the digitized sampled signals of each of the four channels is digitally controlled by Digital Automatic Gain Control (DAGC) 332.

Output signals from DAGC 332 are then processed by known adaptive DSP techniques such as feed forward equalization (FFE) 334, echo cancellation (ECHO) 338 for full duplex, and near-end (NEXT) 340 and far-end (FEXT) 342 adaptive cross talk cancellation between twisted pairs within the cable. The output samples of the FFE blocks are then applied to slicers 344 which control time recovery circuitry to provide the synchronization of the receiver signal to the transmitter. These output signals (data bits) are decoded using forward error correction (FEC) 310 and processed by the PCS RX (described in detail in FIG. 3C) and then sent to a MAC receiver (router/switch) through one or more XGMII/XFI interfaces 302 (typically two).

Figure 3B:
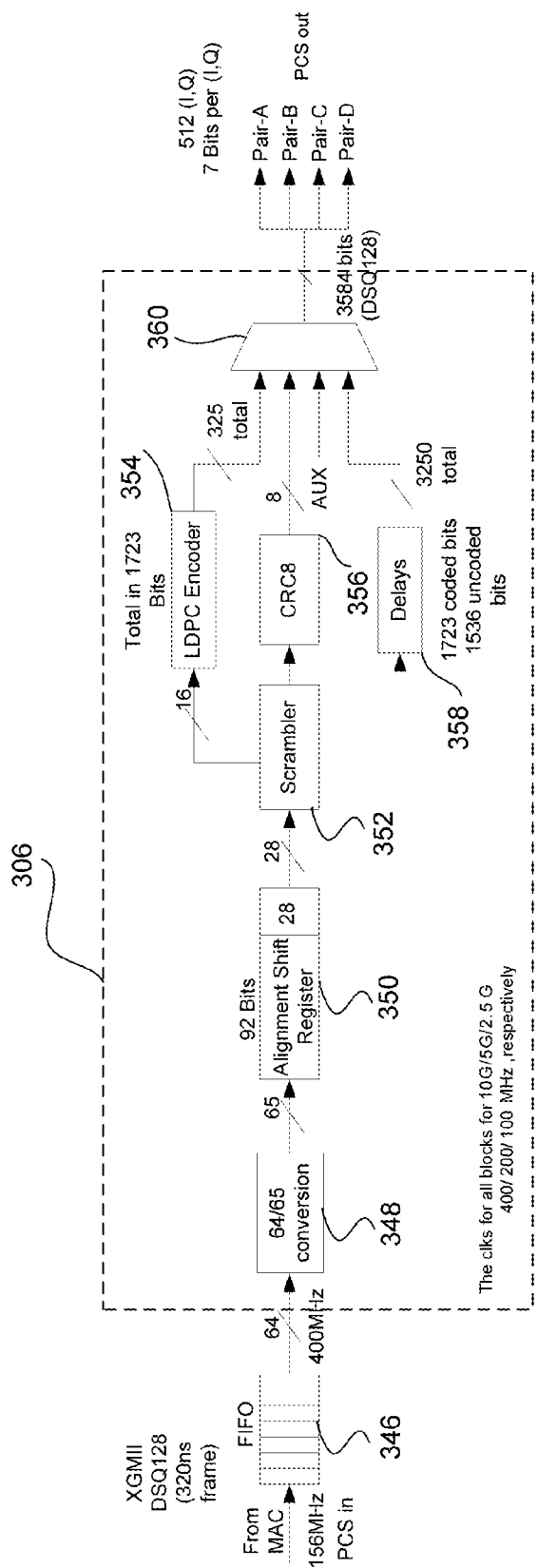
FIG. 3B illustrates an example PCS TX embodiment of a transceiver architecture in accordance with the present disclosure.

FIG. 3B illustrates an example PCS TX embodiment of a transceiver architecture. When transmitting data at 10 G, a serial/parallel data frame at that rate occupies a frame time duration (period). However, when transmitting at a reduced data speed, such as 2.5 Gbps or 5.0 Gbps, the entire 10 Gbps transmit duration is not needed to transmit data. For example, only one half of the 10 Gbps frame time duration is needed for 5 Gbps and only one quarter for 2.5 Gbps. Therefore, data frames received at XGMII/XFI 302 will have both data sequences as well as quiet times with no data sent. For example, a 10G time slot will be used one quarter of the time for 2.5G, with three quarters left empty (quiet). Part of the process of the PCS TX is to buffer the received data and strip out the quiet time slots to produce only the data.

In an alternative embodiment, a clock rate (speed) of the interface 302 is reduced to match the data frame duration of a reduced data speed. For example, if the 10G clock speed is 156 MHz for data input to the FIFO, a speed of 156 MHZ/4 would be used for the 2.5 GHz data rate (2.5/10*156=39 MHz). In this embodiment, no quiet slots would need to be removed.

FIFO 346 defines the physical layer specifications for the transmission layer. For example, FIFO 346 buffers the data to produce the example 2.5G or 5G data frames with quiet time slots removed which are then fed to PCS TX 306. The PCS input data (bits) are applied to data line coding (64/65 conversion) 348, aligned in alignment shift register 350 and scrambled by scrambler 352 for randomness of the data, and then passed through error protection coding (Low-Density parity-check coder (LDPC)) 354 to form a data frame which consists of coded and un-coded bits. LDPC can achieve relatively low BERs (Bit Error Rates) near the Shannon limit of a given communication channel.

The Shannon limit may be viewed either as the lowest SNR (Signal-to-Noise Ratio) at which for a given data rate theoretically error-free data transmission may be accomplished, or the maximum data rate for error-free transmission over a channel with given SNR. The ideal goal has been to closely approach the Shannon limit with affordable complexity and limited latency for decoding and decoding while maintaining a given target BER performance.

Near-capacity achieving coded modulation is required to enable 10G operation over the envisaged copper cabling at a target BER of $10_{-12}$. An upper limit on latency of 2048 modulation intervals, or 25,600 bits on four wire pairs, precludes the use of most traditional concatenated coding schemes.

Each data frame is then appended (combined 360) with its cyclic redundancy check (CRC) 356 bits and one auxiliary bit and delayed data 358. One data frame (one LDPC frame) duration can be 640/1280 ns for 2.5 G/5 Gbps, respectively. The output of the PCS block, which is one data frame, is then connected to the four DSQ128 symbol mappers 312 of FIG. 3A.

Figure 3C:
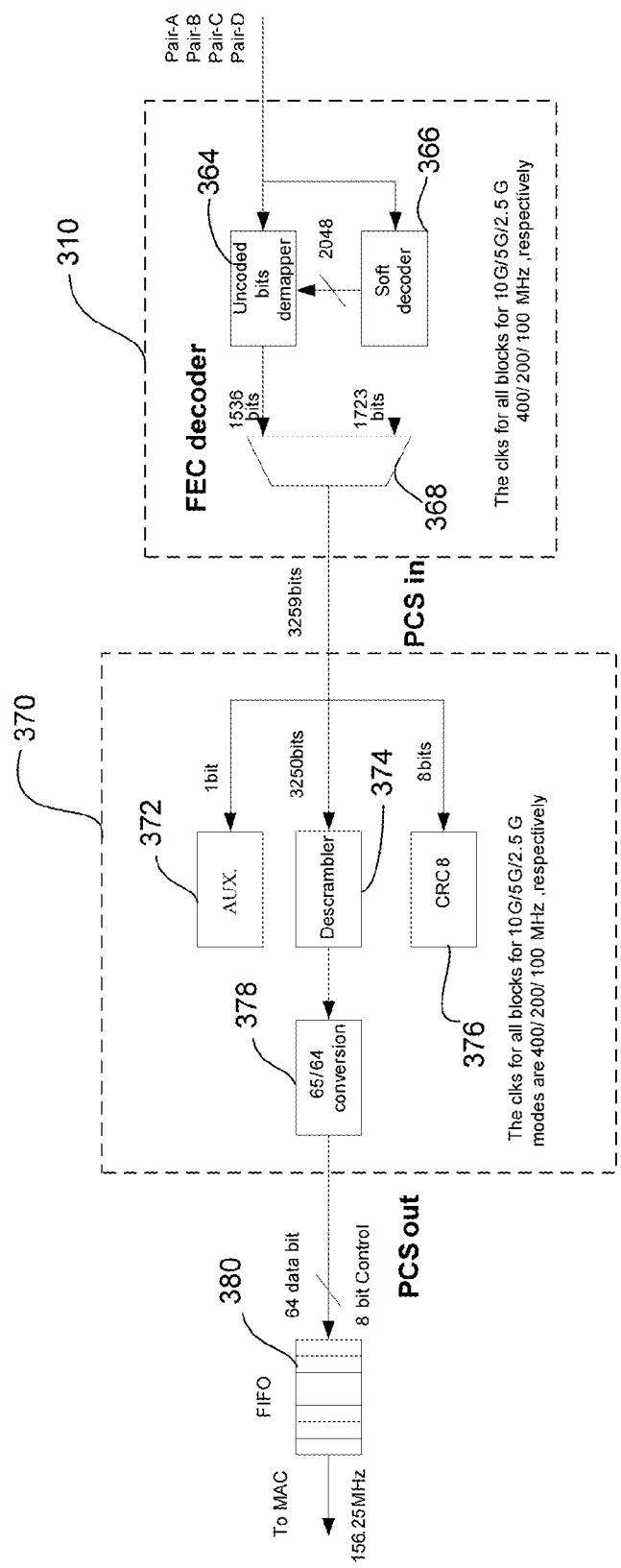
FIG. 3C illustrates an example PCS RX embodiment of a transceiver architecture in accordance with the present disclosure.

FIG. 3C illustrates an example PCS RX embodiment of a transceiver architecture. Slicers 344 output a series of four pair data frames (data frames from twisted pairs A/B/C/D) that are decoded at (forward error correction) FEC 310. Decoding includes decoding of un-coded bits by un-coded bits demapper 364 and coded bits through low-density parity-check decoder (LDPC) (soft decoder) 366 and then combining the decoded bits (multiplexer 368). PCS receiver block 370 then strips the data (e.g., 3,250 bits), CRC bits (e.g., 8 bits) 374 and auxiliary bit (1 bit) 372 from the output frame of LDPC decoder 368 output. Descrambler 374 descrambles the data bits. The descrambled data bits are then passed to 65/64 data line transcoder 378 and then to MAC receiver (router/switch) through the FIFO 380 and one or more interfaces 302. In one embodiment, FIFO 380 may insert (stuff) quiet sequences in unused time slots (e.g. 10G time slots—see FIG. 3B discussion) or as with the FIG. 3B alternate embodiment, reduce the clock speed to match a reduced data rate clock speed.

While the present disclosure relates to using an existing cat5e cabling network to support the new 802.11ac WAP connectivity between routers, the transceiver architecture of the present disclosure can be modified as needed (e.g., clock rates) to send higher data rate signals over any typically slower communication channel structures without departing from the scope of the present disclosure.

While the specific clocks of the DAC/ADC have been described, each of the clocks of each block within layers 301-1 through 301-N as well as PCS block 304 are clocked at a fraction (proportion) of the typical 10G standard speeds for lower data transmission rates. For example, all circuit elements are clocked at one half speed of the 10G clocks for 5G data speeds and one quarter speed for 2.5G data speeds.

Figure 4:
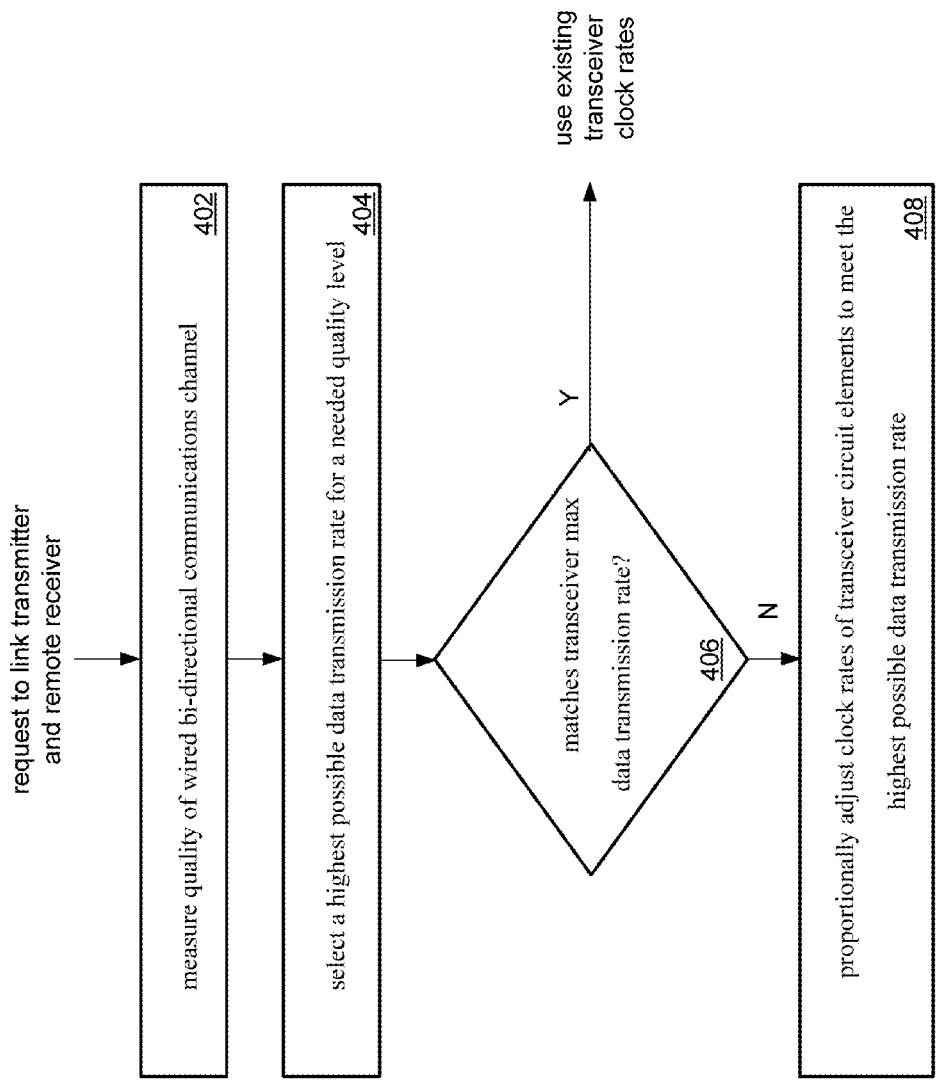
FIG. 4 illustrates an example embodiment flowchart in accordance with the present disclosure.

FIG. 4 illustrates an example embodiment flowchart in accordance with the present disclosure. In this embodiment, example data transmission rates (speeds) of 2.5 Gbps and 5 Gbps may be negotiated between transceivers of various link partners (i.e., WAP and router—see training mode discussion) based upon the measured quality of their link. In step 402, the quality of the communications link (e.g., Cat5 cable) is measured and, in step 404, the highest possible common data rate is selected for a needed quality level. In step 406, if the highest possible common data rate is the existing data transmission rate of the two transceivers (e.g., 10G), then no adjustment to clock rates (speeds) is needed. If the highest possible data rate selected for a needed quality level falls below the existing data transmission rate of the transceivers, in step 408, the clocks of the transceiver circuit elements are then proportionally adjusted ((R)/(M))*(MCF) to meet the bits per second data rates of the selected data speed.

In various embodiments, the technology of the present disclosure may be utilized for existing Ethernet cat5e cabling systems in, for example, campus buildings, residential and business environments.

The terms "circuit" and "circuitry" as used herein may refer to an independent circuit or to a portion of a multi-functional circuit that performs multiple underlying functions. For example, depending on the embodiment, processing circuitry may be implemented as a single chip processor or as a plurality of processing chips Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present disclosure has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims of the present disclosure.

The present disclosure has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims of the present disclosure. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present disclosure has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims of the present disclosure.

Moreover, although described in detail for purposes of clarity and understanding by way of the aforementioned embodiments, the present disclosure is not limited to such embodiments. It will be obvious to one of average skill in the art that various changes and modifications may be practiced within the spirit and scope of the claims of the present disclosure.

What is claimed is:

1. A method of transferring data between a first and second transceiver over a wired bi-directional communications channel, the method comprises:
   measuring a quality level of the wired bi-directional communications channel; selecting a maximum possible data transmission rate over the wired bi-directional communications channel for the measured quality level;
   when the maximum possible data transmission rate for a measured quality level is a reduced data transmission rate less than a maximum data transmission rate, proportionally adjusting clock rates of circuit elements of the first and second transceiver to transfer the data at the reduced data transmission rate to mitigate intersymbol interference (ISI) of the wired bi-directional communications channel; and
   wherein the proportionally adjusting clocks comprises adjustment based on:

adjusted clock rate=$((R)/(M))*(MCF)$, where:

R=reduced data transmission rate;
   M=maximum data transmission rate; and
   MCF=maximum data transmission rate clock frequency.

2. The method of claim 1, wherein the first and second transceivers are 10 Gbps transceivers and the data transmission rate includes at least one of 2.5 Gbps or 5 Gbps.

3. The method of claim 2, wherein, for 5 Gbps data transmission rates, the proportionally adjusting clocks comprises adjusting the first and second transceiver's transmit DAC clock to 400 MHz and receive ADC clock to 400 MHz.

4. The method of claim 2, wherein, for 2.5 Gbps data transmission rates, the proportionally adjusting clocks comprises adjusting a transmit DAC clock to 200 MHz and receive ADC clock to 200 MHz.

5. The method of claim 1, wherein the wired bi-directional communications channel comprises Cat5 or Cat5e cabling.

6. The method of claim 5, wherein the Cat5 or Cat5e cabling transfers data using an 802.11ac communication standard.

7. The method of claim 1 further comprising dividing data frames of the data to be transmitted N times, where N=number of layers of at least a portion of identical transceiver processing circuitry, and wherein an output of each of the N layers of the portion of identical transceiver circuitry is connected respectively to a twisted wiring pair of the wired bi-directional communications channel.

8. A method of transferring data between a router and a wireless access point (WAP) over a wired bi-directional communications channel within category 5 (Cat5) cabling, the method comprising:
   measuring a quality level of the wired bi-directional communications channel;
   selecting a maximum possible data transmission rate over the wired bi-directional communications channel for the measured quality level;
   when the maximum possible data transmission rate for a measured quality level is a reduced data transmission rate less than a maximum data transmission rate of transceivers operative with the router and WAP, proportionally adjusting clocks of circuit elements of the transceivers to transfer the data at the reduced data transmission rate to mitigate intersymbol interference (ISI) of the wired bi-directional communications channel; and
   wherein the proportionally adjusting clocks comprises adjustment based on:

adjusted clock rate=$((R)/(M))*(MCF)$, where:

R=reduced data transmission rate;
   M=maximum data transmission rate; and
   MCF=maximum data transmission rate clock frequency.

9. The method of claim 8 further comprising dividing data frames of the data to be transferred N times, where N=number of layers of at least a portion of identical transceiver processing circuitry, and wherein an output of each of the N layers of the portion of identical transceiver circuitry is connected respectively to a twisted wiring pair of the category 5 (Cat5) cabling.

10. The method of claim 9 further comprising for the data to be transferred, prior to dividing the data frames:
    receiving the data to be transferred at a 10 Gbps rate:
    repeating the data to be transferred (R/M) times;
    stuffing the data to be transferred with idles to increase speed; and
    interfacing at 2.5 Gbps/5 Gbps.

11. A transceiver architecture, the transceiver architecture comprising:
    an interface receiving data frames at a first data transmission rate;
    a first-in, first-out (FIFO) buffer to buffer the data frames as received from the interface;
    a physical coding sub-layer (PCS) block receiving the data frames from the FIFO and outputting a plurality of parallel data sub-frames at a reduced data transmission rate;
    a multi-layer transmission circuit, wherein each of the plurality of parallel data sub-frames is input to a respective layer of the multi-layer transmission circuit, each layer of the multi-layer transmission circuit layer processing the data sub-frames at the reduced data transmission rate with a proportionally reduced clock rate to mitigate intersymbol interference (ISI) of a coupled twisted pair transmission medium; and
    wherein the proportionally reduced clock rate is adjusted as per:

adjusted clock rate=$((R)/(M))*(MCF)$, where:

R=reduced data transmission rate;
    M=maximum data transmission rate; and
    MCF=maximum data transmission rate clock frequency; and
    an output interface connecting each of the processed data sub-frames to the twisted pair transmission medium.

12. The transceiver architecture of claim 11, wherein the physical coding sub-layer (PCS) block includes:
    a PCS TX (transmitter);
    a PCS RX (receiver); and
    forward error correction (FEC).

13. The transceiver architecture of claim 12, wherein the PCS TX comprises:
    a 64/65 bit converter;
    an alignment shift register coupled to an output of the 64/65 bit converter;
    a data scrambler coupled to an output of the alignment shift register;

a Low-Density parity-check coder (LDPC) coupled to the data scrambler;
a cyclic redundancy check (CRC) coupled to the data scrambler;
a delay line coupled to the data scrambler;
one auxiliary bit input; and
a multiplexer to multiplex outputs from the LDPC, CRC, delay line and auxiliary bit input.

14. The transceiver architecture of claim 12, wherein the PCS RX comprises:
   a stripper to strip CRC bits and an auxiliary bit;
   a descrambler to descramble data bits;
   a 65/64 data line transcoder; and
   a first-in, first-out (FIFO) buffer.

15. The transceiver architecture of claim 11, wherein a transmit path of the multi-layer transmission circuit layer comprises:
   a symbol mapper converting the data sub-frames to a plurality of output symbols;
   a pre-equalizer, coupled to an output of the symbol mapper, mitigating intersymbol interference (ISI) of a communications channel;
   a digital transmission TX filter coupled to an output of the pre-equalizer;
   a digital to analog converter (DAC) coupled to an output of the digital TX filter; and transformers to connect analog data signals output from the DAC to the twisted pair transmission medium.

16. The transceiver architecture of claim 11 wherein a receive path of the multi-layer transmission circuit layer comprises:
   transformers to connect analog data signals received from the twisted pair transmission medium;
   a programmable gain amplifier (PGA) amplifying the received analog data signals;
   an analog to digital converter (ADC) converting the amplified analog signals to digitized sampled signals;
   a digital automatic gain control (DAGC) digitally controlling gain of the digitized sampled signals;
   an adaptive digital processing block to reduce cross talk between twisted pairs within the twisted pair transmission medium; and
   slicers coupled to the adaptive digitally processed signals to provide synchronization of a receiver signal to a transmitter.

17. The transceiver architecture of claim 11, wherein the interface comprises a MAC interface:
   receiving data at 10 Gbps rate:
   repeating MAC data (R/M) times;
   stuffing MAC data with idles to increase speed; and
   interfacing at 2.5 Gbps/5 Gbps.

* * * * *